April 3, 1962  R. P. STRICK  3,027,876
FLUID MOTOR WITH SEQUENCE VALVE
Filed Dec. 5, 1960

United States Patent Office 3,027,876
Patented Apr. 3, 1962

3,027,876
FLUID MOTOR WITH SEQUENCE VALVE
Rudolf Paul Strick, 11 Alaric Terrace,
West Roxbury, Mass.
Filed Dec. 5, 1960, Ser. No. 73,745
6 Claims. (Cl. 121—38)

This invention relates to fluid motors of the cylinder and piston type having a sequence valve built in the cylinder.

The principal objects of the invention are to provide a fluid motor with a built-in pressure-operated sequence valve which opens at a predetermined fluid pressure, and to provide a fluid motor with a pressure-operated sequence valve which, as soon as it has been opened, does not restrict the flow of the fluid nor cause any pressure drop of the same. Thus it is possible to move the piston with high speed if the exhaust is not restricted and if there is an ample supply of fluid available to enter the fluid motor. The motor, forming the subject of my invention, includes a cylinder comprising a tube having a piston slidable therein. A magnet having a port extending therethrough is fixed at one end of the cylinder, and the piston has a poppet connected to it by a flexible connection. A stop member, which may also be used to secure the magnet in place, is mounted in the tube to limit the movement of the piston in the direction of the magnet. When the piston bears against the stop member, the poppet is attracted to the magnet to block the port. When fluid of a predetermined pressure is applied through the port, the poppet due to its flexible connection is moved away from the magnet to expose the port and permit the application of pressure against the piston to thereby move the piston.

Reference is now made to the accompanying drawing and the following detailed description and claims for a clearer understanding of the invention.

Figure 1:
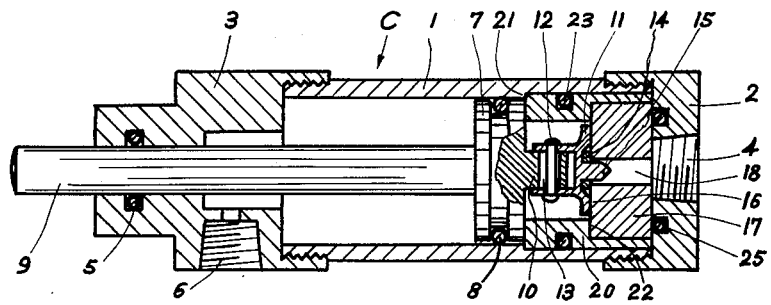
FIG. 1 is a longitudinal sectional view of the fluid motor showing the valve in closed position.

In the drawing, C indicates a cylinder comprising a tube 1 which is threadedly connected to the cap 2 and the piston rod guide 3. The cap 2 has a groove in which is located the O-ring 25 and a threaded opening 4 by which the cylinder may be connected to a source of fluid pressure. The piston rod guide 3 has a groove in which is located the O-ring 5 and threaded opening 6 by which the cylinder may be connected to a fluid exhaust hose. In the tube 1 is slidably mounted the piston 7 which has a groove to hold the O-ring 8. The piston 7 has a piston rod 9 extending toward and slidable in the guide 3 and a poppet guide 10 extending toward the cap 2, the piston, piston rod and poppet guide being slidable in unison in the cylinder. The poppet guide 10 is connected by a flexible connection to a poppet 11 to permit the poppet and poppet guide to partake of relative movement. The connection comprises the poppet guide being located in a bore of the poppet so that the poppet guide guides and supports the poppet. The pin 12, rigidly connected to the poppet, and extending through an elongated slot 13 in the poppet guide, enables the poppet 11 to slide axially on the poppet guide 10 and thus provide the aforementioned flexible connection.

The poppet has an axially extending prong 15 and a flat face 16. A groove is positioned intermediate the prong 15 and the face 16, and a seal 14 is seated in the groove. A cylindrical stop 20 is seated in the tube 1 between a shoulder 21 on the cylinder and the cap 2. The stop 20 also serves as a magnet holder for a permanent magnet 17, having for this purpose a shoulder 22 to accommodate the magnet which has an axial bore 18, said magnet being interposed between the shoulder 22 and the cap 2. The bore 18 is in alignment with the opening 4 and serves with opening 4 as a port to admit fluid into the cylinder. A gasket is compressed between the stop 20 and the magnet 17, an O-ring 23 is compressed between the stop and the tube 1, and an O-ring 25 is compressed between the magnet and the cap 2, said gasket and O-rings serving as seals to prevent leakage of fluid.

Figure 2:
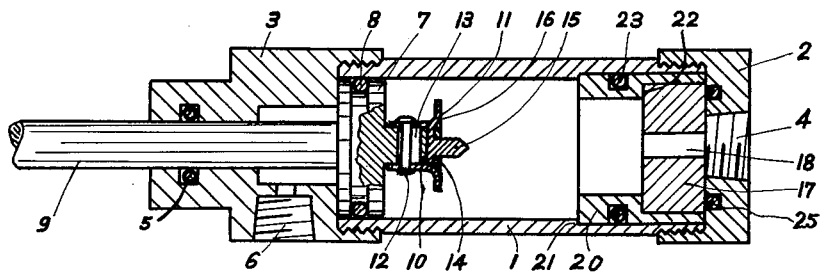
FIG. 2 is a view similar to FIG. 1 but showing the valve in open position and the piston advanced.

The operation of the fluid motor according to my invention is as follows:

It is assumed that the piston 7 is seated against the stop 20 as shown in FIG. 1. Since the poppet 11 is slidably connected with the piston by means of poppet guide 10 and pin 12, it has been moved into the magnetic field of the magnet 17. The magnetic forces yieldably clamp the poppet 11, comprising ferrous material, on the surface of the magnet, thus blocking the port formed by hole 18. This way, with the aid of the seal 14, a leakproof fit has been provided between the poppet 11 and the magnet 17. When pressurized fluid, preferably air, enters the fluid motor through the opening and the bore 18 in the center of the magnet 17, it will first be stopped by the poppet 11. However, as the pressure builds up it exerts more pressure on the poppet 11 and will finally overcome the holding force of the magnet 17 and move the slidable poppet 11 to the left. In that very moment the pressurized fluid can bypass the poppet 11 and will exert pressure on the piston 7. On account of this pressure the piston 7 moves to the left and takes along poppet 11 because its axial movement on the poppet guide 10 is limited by the length of elongated slot 13. When the poppet 11 moves to the left it gets entirely out of range of the magnetic field and leaves the bore 18 completely unblocked and does not provide any restriction for the incoming pressurized fluid. Therefore, the pressure-operated sequence valve, basically consisting of the magnet 17 and the slidably mounted poppet 11, does not cause any pressure drop and the piston 7 can be moved to the left (FIG. 2) with the same pressure that enters the fluid motor at port 4.

Figure 3:
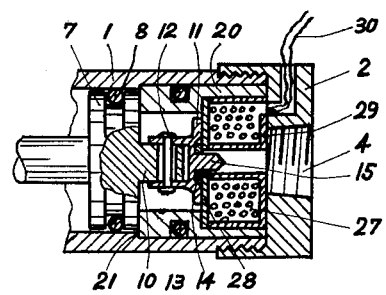
FIG. 3 is a sectional view of part of the motor showing a modified valve.

FIG. 3 illustrates a modification of the invention wherein an electrical magnet 27 having a bottom plate 28, coil housing 29 enclosing a coil, and electrical leads 30 for the coil are substituted for the permanent magnet 17. The electrical magnet performs in the same manner as the permanent magnet in the operation of the sequence valve.

Figure 4:
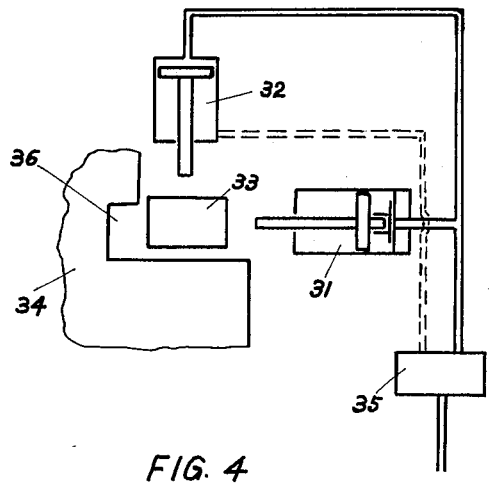
FIG. 4 is a schematic illustration of a system wherein the invention may be utilized.

In FIG. 4 is schematically shown the application of the fluid motor 31 according to my invention in cooperation with a standard fluid motor 32. Of course, it will be understood that there are many variations possible. Workpiece 33 has to be located in a cutout 36 of the plate 34. By operation of the master valve 35 the pressurized fluid reaches through connecting hoses port 4 of the fluid motor 31 and the corresponding port of fluid motor 32. However, as explained before, fluid motor 31 will not work until a predetermined pressure operates the built-in sequence valve and therefore, the pressurized fluid will first move the piston and piston rod of the fluid motor 32 thus lining up the workpiece 33 in front of the cutout 36. As soon as the piston of fluid motor 32 can not move any farther, the pressure of the fluid increases and the sequence valve of the fluid motor 31 will be opened. Now the piston and piston rod of fluid motor 31 are moved to the left and the workpiece 33 is pushed into the cutout 36. A release of the master valve 35 reverses the flow of the fluid, thus bringing back the fluid motors 32 and 31 into starting position.

Another feature of the fluid motor according to my invention is the capability of operating its piston and piston rod with high speed as is often necessary for stapling, piercing, stamping, or similar operations. To accomplish this, it will be the best to use compressible fluid like air and let the same accumulate in a container connected to port 4 of the fluid motor. The built-in sequence valve, basically consisting of poppet 11 and permanent magnet 17 or electrical magnet 27, will cause an accumulation of air and a pressure increase of the same until the pressure is high enough to overcome the holding force of the magnet. As described before, now the air goes around the poppet 11, exerts pressure on the piston 7, moves the piston 7 to the left, and with it poppet 11. It is also assumed that port 6 is open so that the exhausting air will not build up a cushion in front of the piston when moving to the left. The air, rushing in through opening 4 and the hole in the center of the permanent magnet 17 or the electrical magnet 27 and not being restricted by the poppet 11 after a short movement of the piston 7, can exert its full pressure on the piston 7 and move the same with high speed to the left.

While I have shown a particular form of embodiment of my invention I am aware that many minor changes therein will readily suggest themselves to others skilled in the art without departing from the spirit and scope of my invention.

Having thus described my invention what I claim as new and desire to protect by Letters Patent is:

1. A fluid motor comprising a cylinder, a piston slidably mounted in the cylinder, a port located in the cylinder through which fluid under pressure may enter, a poppet positioned in alignment with the port, a flexible connection between the poppet and the piston, and magnetic means positioned adjacent the poppet for yieldably urging the poppet into blocking relation with the port, said magnetic means being overcome upon the application of a predetermined fluid pressure through the port to move the poppet away from the port and permit the application of fluid pressure against the piston.

2. A fluid motor comprising a cylinder, a piston slidably mounted in the cylinder, a magnet adjacent one end of the cylinder, a port extending through the magnet, a poppet positioned in alignment with the port, and means connecting the poppet to that side of the piston facing the magnet for limited axial movement with respect to the piston, said poppet having a face adapted to bear against the magnet and being urged against the magnet by magnetic attraction to thereby block the port, whereby upon the application of a predetermined fluid pressure through the port the magnetic attraction will be overcome and the poppet will be moved away from the magnet to permit the application of the pressure against the piston.

3. A fluid pressure motor having a cylinder comprising a tube, a magnet located at one end of the tube, a port extending through the magnet, a piston slidably mounted in the tube, a stop member located in the tube intermediate the piston and the magnet and adapted to limit the movement of the piston in the direction of the magnet, and a poppet positioned in alignment with the port and connected to that side of the piston facing the magnet for limited axial movement with respect thereto, said poppet having a face adapted to bear against the magnet and being urged against the magnet by magnetic attraction to thereby block the port, whereby, upon the application of a predetermined fluid pressure through the port, the magnetic attraction will be overcome and the poppet will be moved away from the magnet to permit the application of the pressure against the piston.

4. A fluid pressure motor comprising a cylinder, a piston slidably mounted in the cylinder, sealing means interposed between the piston and the cylinder to prevent the passage of fluid under pressure between the contiguous walls of the piston and cylinder, a port located in the cylinder through which fluid under pressure may enter, blocking means connected to the piston positioned to block the port, and force means associated with the cylinder yieldably urging the blocking means into blocking position, said force means being overcome upon the application of a predetermined fluid pressure through the port to unseat the blocking means and permit the application of the pressure on the piston.

5. A fluid pressure motor comprising a cylinder, a piston slidably mounted in the cylinder, sealing means interposed between the piston and the cylinder to prevent the passage of fluid under pressure between the contiguous walls of the piston and the cylinder, a port located in the cylinder through which fluid under pressure may enter, a poppet adapted to block the port positioned in alignment with the port, a flexible connection between the poppet and the piston, and force means in the motor yieldably urging the poppet into blocking relation with the port, said force means being overcome upon the application of a predetermined fluid pressure through the port to move the poppet away from the port and permit the application of the pressure against the piston.

6. The motor according to claim 5 wherein the force means comprises a magnet rigid with the cylinder at one end of the cylinder, the port extends through the magnet, and the poppet has a face adapted to bear against the magnet to thereby block the port.

References Cited in the file of this patent

UNITED STATES PATENTS

| | | |
|---|---|---|
| 671,559 | Lindstrom | Apr. 9, 1901 |
| 828,091 | Crane | Aug. 7, 1906 |
| 1,364,980 | Burnham | Jan. 11, 1921 |

FOREIGN PATENTS

| | | |
|---|---|---|
| 361,122 | Great Britain | Nov. 19, 1931 |